United States Patent

Häfner

[11] Patent Number: 5,670,751
[45] Date of Patent: Sep. 23, 1997

[54] BULK MATERIAL WEIGHING CONTAINER WITH PRESSURE FEEDBACK

[75] Inventor: Hans Wilhelm Häfner, Aichach-Walchshofen, Germany

[73] Assignee: Pfister GmbH, Augsburg, Germany

[21] Appl. No.: 305,830

[22] Filed: Sep. 14, 1994

[30] Foreign Application Priority Data

Sep. 21, 1993 [DE] Germany ............ 43 02 030.9

[51] Int. Cl.⁶ .................................................. G01G 13/10
[52] U.S. Cl. ........................ 177/1; 177/50; 177/60; 177/116; 222/56
[58] Field of Search ................. 177/1, 50, 60, 177/116; 222/56, 61

[56] References Cited

U.S. PATENT DOCUMENTS

| | | | |
|---|---|---|---|
| 4,494,678 | 1/1985 | Klein | 222/77 |
| 4,679,704 | 7/1987 | Dunlop et al. | 222/56 |
| 4,974,646 | 12/1990 | Martin et al. | 177/116 |
| 5,033,914 | 7/1991 | Wuertele et al. | 222/61 X |

FOREIGN PATENT DOCUMENTS

| | | |
|---|---|---|
| 140213 | 5/1985 | European Pat. Off. |
| 2456344 | 5/1980 | France . |
| 3228714 | 2/1984 | Germany . |
| 3310735 | 9/1984 | Germany . |
| 3413757 | 10/1985 | Germany . |
| 1118726 | 8/1989 | Japan . |
| 658724 | 11/1986 | Switzerland . |

OTHER PUBLICATIONS

European Search Report (3 pages), Feb. 22, 1994.

*Primary Examiner*—Michael L. Gellner
*Assistant Examiner*—Randy W. Gibson
*Attorney, Agent, or Firm*—Knobbe, Martens, Olson & Bear LLP

[57] ABSTRACT

In order to provide a method of gravimetric metering of bulk materials with a calibration facility thus achieving higher weighing accuracy there is proposed a method wherein the pressure in the weighing container is measured and the weighing signal is only transferred from the weighing electronics to be registered when a limit pressure value is attained, especially atmospheric pressure.

16 Claims, 2 Drawing Sheets

BULK MATERIAL WEIGHING CONTAINER WITH PRESSURE FEEDBACK

FIELD OF INVENTION

This invention relates to a method and a device for gravimetric metering of bulk materials, which are fed to a weighing container out of one or more feed container(s), are there weighed with determination of a weighing signal for passing on to a weighing electronics and metering control and are then fed out of the weighing container.

BACKGROUND OF THE INVENTION

Such a method of feeding a container with powdery materials is known from DE 34 13 757 A1. At least one feed pipe here opens into a weighing container and powdery bulk material is sucked therethrough from one or more supply containers, weighed additively and fed to a mixing device after opening a bottom closure. Such batching plants for metering charges of powdery materials are used in the ceramics industry or in the making of plaster for example, where several kinds of different binders, fillers, colors, additives are weighed out. The bulk materials are fed through auger conveyors or in a pneumatic conveyor stream to the common weighing container. In such weighing devices, which are arranged in a pneumatic conveyor stream the weighing accuracy is however dependent significantly on the flow characteristics. Thus pressure shocks, such as act on the weighing scale through valve operations for example have to be avoided. In addition the lines opening in and out for feeding and discharging frequently run horizontally in the region of their connections, so that pressure changes do not have any effect on the weighing cells of the weighing container. These measures are however not adequate to exclude the pressure conditions affecting the weighing signal, so that even with small pressure differences, whether over-pressure or under-pressure, can falsify the weighing results.

A correction method for a weighing container is further known from DE 33 10 735 A1 in which the action of stray forces on the weighing results are minimized in that a correction value is determined from the apparent loading or weight alterations of the weighing container in dependence on the temperature or pressure and is then superimposed on the weighing signal by corresponding addition or subtraction. Since intervention is here directly into the weighing signal, there is no calibration facility in such batching plants. This kind of correction system using correction values to be subtracted from or added to the weighing signal is are disclosed in Swiss patent CH 658 724 A5. However, in most countries an intervention in the electronic scale system is generally prohibited by governmental regulations in order to avoid manipulations on the measuring signal.

SUMMARY OF THE INVENTION

The invention is accordingly based on the object of providing a method of gravimetric metering of bulk materials with a calibration facility and a corresponding device, whereby a higher weighing accuracy is attained.

The object of the present invention is met by a method of gravimetric metering of bulk materials, including the steps of feeding the material to a weighing container from one or more feed containers, weighing the material in the container, sending a weighing signal to an electronic metering control, feeding the material out of the container, measuring the pressure in the container, and transferring the signal from the weighing electronics to be registered when a predetermined pressure is sensed in the container. The object of the present invention is also met by an apparatus for gravimetric metering of bulk material, comprising a weighing container supported on at least one weighing cell. The container is connected through flexible connections to a bulk material feed line and a discharge line. The weighing cell is connected to an electronic metering control. A pressure sensor is provided on the weighing container to detect the pressure therein, and is connected to the electronic metering control to register a weighing signal from the weighing cell when a predetermined pressure within the container is sensed.

By arranging a pressure sensor to measure a predetermined range of pressure in the weighing container, the current pressure conditions in the weighing container can be detected and only on attaining or falling below a certain limit pressure value the weighing signal of the weighing cells is transferred from the weighing electronics to be registered. This avoids weighing being carried out at too large an under-pressure or over-pressure, which could falsify the weighing results of the calibrated weighing cell and weighing electronics. The recording of the weighing results and switching in the next metering step only takes place when the pressure in the weighing container agrees substantially with the ambient pressure.

The pressure signal is also used in an advantageous embodiment to control the bulk material feed. If there is an excess pressure in the weighing container for example, the metering member, for example a feed vane, can be closed with a certain delay, since smaller amounts of the bulk material flow, for example at the point in time of switching over from coarse flow to the fine flow metering, there are smaller after-flow amounts of the bulk material because of the excess pressure obtaining in the weighing container. In this way more accurate metering is facilitated, since the metering control is given a supplementary load, which is fed by a correspondingly longer metering phase.

DETAILED DESCRIPTION OF PREFERRED EMBODIMENTS

Figure 1:
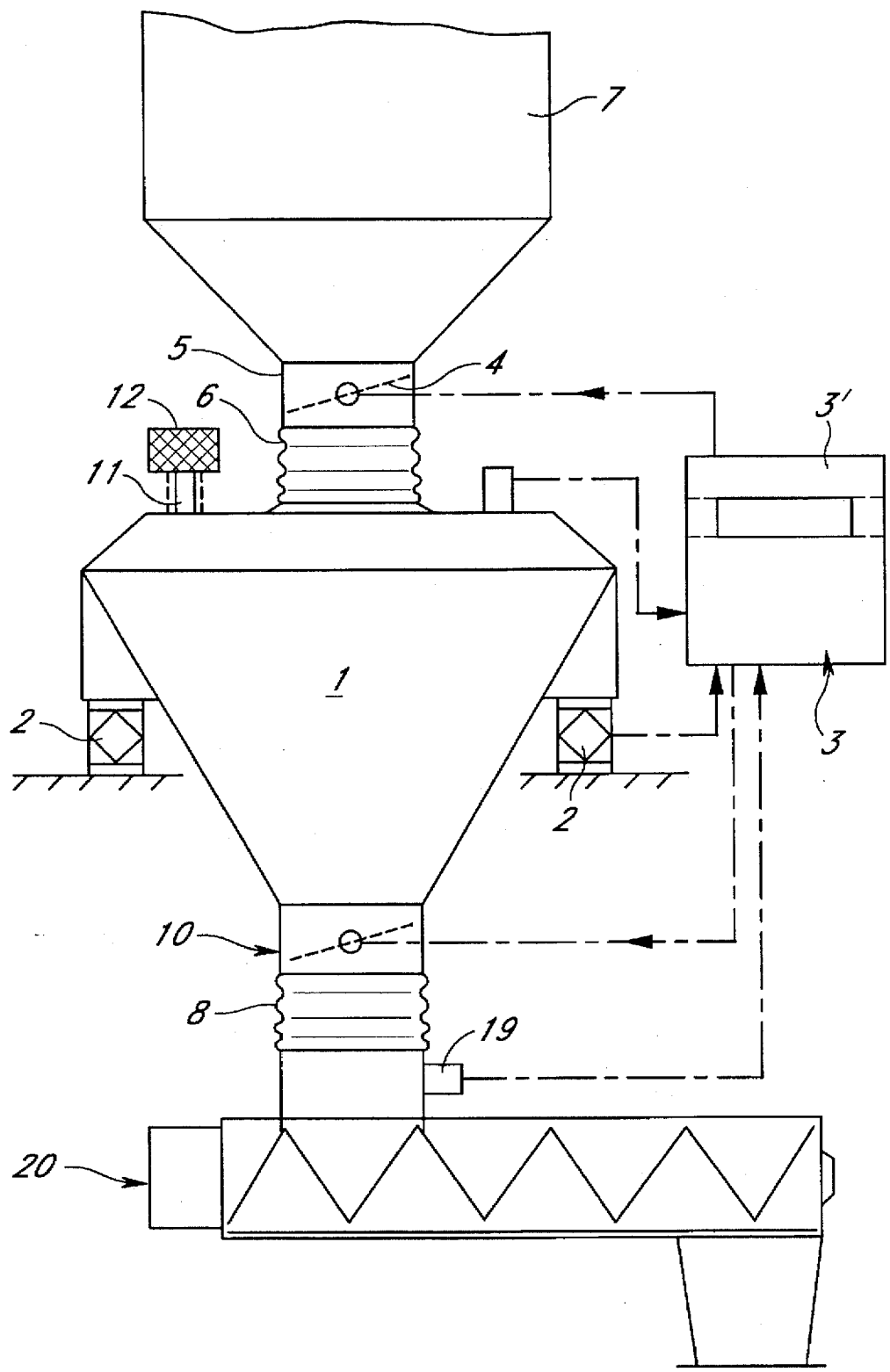
Figure 2:
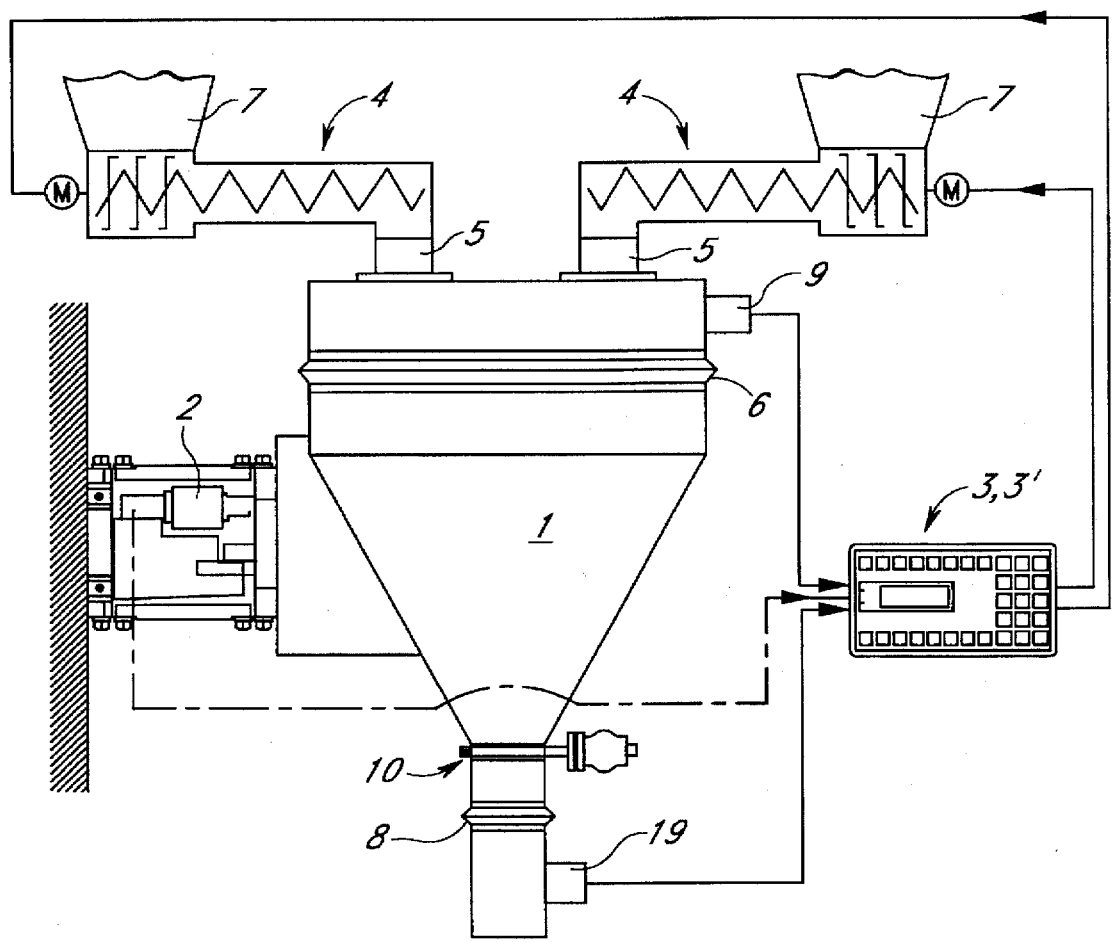

Two embodiments will be described and explained in detail with reference to the drawings, in which:

FIG. 1 shows a container weighing scale with feed of one bulk material component; and FIG. 2 shows a container weighing scale with two feed members.

FIG. 1 shows schematically a first embodiment of a container weighing scale, wherein a weighing container 1 is so mounted, in a way not shown in detail, that it is supported on a plurality of weighing cells 2. The outputs of the weighing cells 2 is connected to weighing electronics with an integrated metering control 3', which records, processes and displays the weight of the weighing container 1 in a control computer. The metering control 3' actuates a metering member 4, which is shown here in the form of a vane in a feed pipe 5. The metering member 4 can also be formed as a slider, an auger screw or a vibrating tray or the like. The feed pipe 5 is connected by a flexible coupling 6, especially a compensator, to a feed container (silo) 7 provided above the weighing container 1. Below the weighing container 1 there is a discharge device 10, e.g. an emptying vane, a cut-off slider or a conveyer auger, which is connected by a compensator 8 for de-coupling from the yieldably mounted weighing container 1 to a device for further processing, not described in detail but for example a reaction or mixing vessel 20.

It is now proposed to arrange a pressure sensor 9 on this weighing container 1, in order to permanently detect the pressure obtaining in the weighing container 1. The pressure sensor 9 is connected to the weighing electronics, in which a limit pressure value is predetermined, for example atmospheric pressure, with suitable plus and minus tolerances, depending on the required accuracy, and is stored as a set point or threshold value. Only when the pressure sensor 9 detects a pressure in the weighing container 1 which corresponds to this set-point value or limit pressure value the weighing signal from the weighing cells 2 is registered, i.e. stored or integrated for additive weighing for example. Only then is the metering operation triggered, e.g. the metering in of a further charge by actuating the metering control 3'.

In addition a further pressure sensor 19 can detect pressure conditions at the discharge device 10, especially when this is formed as a suction device. The pressure signals of the pressure sensors 9 and 19 are compared with one another and processed in the weighing electronics 3. Since when charging with powdery bulk materials, especially with high volume streams, a relatively high pressure is attained in the weighing container 1, it is advantageous to provide at least one vent 11 on the weighing container 1 for more rapid pressure relief, so that the desired limit pressure value is reached as rapidly as possible, especially dropping the pressure completely to ambient pressure, in order thus to speed up the weighing cycle. A filter 12 is used for the vent 11 in order to prevent escape of material. The pressure sensor 9 is here of further advantage, since clogging of the filter 12 can be detected, in that the pressure drop of the filter 12 is compared with the pressure drop rate with an unused filter. A signal can thus be given to the operator to exchange or clean the filter 12.

In implementing the discharge device 10 as a pneumatic suction device it is likewise useful to provide venting go that a desired limit pressure value is reached as rapidly as possible also in the discharge device 10, generally atmospheric pressure. When this limit pressure value is attained the weighing signal is transferred from the weighing electronics 3, since there is then no falsification of the weighing results on account of the pressure conditions in the weighing container 1 and the discharge device 10.

On the basis of the pressure measurement with the pressure sensors 9, 19 the bulk material feed can be optimized, especially when switching over from coarse stream feed to fine stream feed or with frequency con, rolled operation of the metering member 4. If for example there is an excess pressure in the weighing container 1, the feed of hulk material through the feed pipe 5 can be improved overall in its accuracy by delayed shutting off of the metering member 4, since there is effectively less after-flow of material against the excess pressure than is provided. By prolonging the metering phase of the metering member 4 in proportion to the pressure detected by the pressure sensor 9 in the weighing container 1, the metering accuracy can be increased.

With an underpressure in the weighing container 1 the converse situation obtains. An under-pressure in the catching container 1 can arise for example if the discharge device 10 is formed as a suction device or the whole container weighing device is formed as a subtraction balance.

A modified embodiment of the container scales is shown in FIG. 2, wherein basically the same reference numerals as in FIG. 1 are employed. In contrast with this the weighing container 1 is not supported on a plurality of weighing cells 3 (FIG. 1) but by means of one, for example a guide rod weighing cell 2 fixed on a frame. The weighing signals of this single deflection weighing cell are again fed to weighing electronics 3 with an integrated metering control 3'. This metering control 3' here regulates or controls two metering members 4, each of which opens into the container 1 through a respective feed pipe 5. Weighing out of a plurality of bulk materials is thus possible by means of the two metering members 4, which take off different components from two or more supply containers. The two feed pipes 5 open into a cover of the weighing container 1, which again has a compensator 6 below this cover, here however with a relatively large diameter. The pressure sensor 9 is again arranged near the compensator 6 and passes its pressure signal to the weighing electronics 3. The same applies to the pressure sensor 19 which is advantageously provided and which is arranged in the vicinity of the lower compensator 8 and the discharge device 10, here shown schematically as a slider. With the embodiment of the upper compensator 6 here shown, only a single compensator is required in the charging region to decouple the weighing container 1 from the feed members, although, as indicated, a plurality of such motoring members 4 with feed pipes 5 can open into the weighing container 1.

Again the weighing signal from the weight cell 2 can only be transferred to and be registered in the weighing electronics 3 when the pressure sensor 9 and if desired the pressure sensor 19 indicate the limit pressure value, especially atmospheric pressure.

I claim:

1. Apparatus for gravimetric metering of bulk material with a weighting container which is supported on at least one weighing cell connected to a weighing electronics and is connected by flexible connections to a bulk material feed line and a discharge line, wherein a pressure sensor is provided on the weighing container for detecting the pressure in the weighing container and the pressure sensor is connected to the weighing electronics for registering a weighing signal only when a limit pressure value is attained.

2. Apparatus according to claim 1, wherein at least one vent for relieving the pressure is provided on the weighing container.

3. Apparatus according to claim 2, wherein a filer is provided on the vent.

4. Apparatus according to claim 1, wherein a further pressure sensor is provided adjoining a discharge device to detect the pressure at the discharge device.

5. A method of metering of bulk materials, comprising the steps of:

feeding the bulk material from a feed container to a weighing container;

weighing the bulk material within the container with a device which generates a signal indicating the material weight;

sending the signal to an electronic weighing and metering control;

discharging the bulk material from the container;

measuring the pressure within the container; and registering the signal indicating the weight of the bulk material when a predetermined pressure within the container is measured.

6. A method according to claim 5, including continuously measuring the pressure in the weighing container.

7. A method according to claim 5, further including venting the weighing container through a vent upon a predetermined increment of increase of pressure in the weighing container.

8. A method according to claim 7, further including filtering the gas vented from the weighing container through a filter in said vent.

9. A method according to claim 8, further including the steps of:

sensing the pressure drop during said step of venting; and comparing the pressure drop with a reference pressure drop known from venting said weighing container through an unused filter to determine if the filter in the vent is clogged.

10. A method according to claim 5, further including the steps of:

discharging the bulk material from the weighing container through a conveyor line;

measuring the pressure within the conveyor line; and comparing the pressure measured in the conveyor line with the pressure measured in the weighing container to obtain a comparison pressure and determine the predetermined pressure.

11. A method according to claim 10, further including discharging the bulk material from the container through a pneumatic feed/discharge system.

12. A method according to claim 10, further including determining the predetermined pressure from a difference between the comparison pressure and zero pressure.

13. A method according to claim 5, further including controlling a metering member positioned between the feed container and the weighing container to optimize metering of the bulk material into the container based on the pressure measured within the weighing container.

14. A method according to claim 13, further including delaying closing of the metering member when an excess pressure is measured within the weighing container.

15. A method according to claim 13, further including hastening the closing of the metering member when an under-pressure is measured in the weighing container.

16. A method according to claim 5, further including registering the signal when the measured pressure within the weighing container equals atmospheric pressure.

* * * * *

UNITED STATES PATENT AND TRADEMARK OFFICE
CERTIFICATE OF CORRECTION

PATENT NO. : 5,670,751
DATED : September 23, 1997
INVENTOR(S) : Hans W. Hafner

It is certified that error appears in the above-identified patent and that said Letters Patent is hereby corrected as shown below:

On title page, item [30], change "43 02 030.9" to read --43 32 030.9--; and

In Claim 1, Column 4, Line 30, change "a weighting" to read --a weighing--.

Signed and Sealed this

Twenty-fourth Day of February, 1998

Attest:

BRUCE LEHMAN

*Attesting Officer*    *Commissioner of Patents and Trademarks*